(12) United States Patent
Haga (10) Patent No.: US 6,715,140 B1
(45) Date of Patent: Mar. 30, 2004

(54) PROGRAM TRACE METHOD AND APPARATUS, AND STORAGE MEDIUM

(75) Inventor: Yutaka Haga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 467 days.

(21) Appl. No.: 09/645,530

(22) Filed: Aug. 25, 2000

(30) Foreign Application Priority Data

Nov. 18, 1999 (JP) ............................................ 11-328758

(51) Int. Cl.[7] ............................. G06F 9/44; G06F 15/00
(52) U.S. Cl. ....................... 717/130; 717/128; 717/129; 714/35; 712/227
(58) Field of Search ........................ 717/124, 127–130; 714/25, 32, 34, 35; 712/227

(56) References Cited

U.S. PATENT DOCUMENTS

| | | | | |
|---|---|---|---|---|
| 3,659,272 A | * | 4/1972 | Price et al. ..................... | 714/45 |
| 4,866,665 A | * | 9/1989 | Haswell-Smith ............. | 714/35 |
| 5,978,902 A | * | 11/1999 | Mann .......................... | 712/227 |
| 6,094,729 A | * | 7/2000 | Mann ........................... | 714/25 |
| 6,202,199 B1 | * | 3/2001 | Wygodny et al. ........... | 717/125 |
| 6,226,270 B1 | * | 5/2001 | Chiku et al. ................. | 370/248 |
| 6,282,701 B1 | * | 8/2001 | Wygodny et al. ........... | 717/125 |
| 6,513,155 B1 | * | 1/2003 | Alexander et al. .......... | 717/124 |
| 6,516,408 B1 | * | 2/2003 | Abiko et al. ................. | 717/129 |

OTHER PUBLICATIONS

Jonathan B. Rosenberg, "How Debuggers Work," 1996, John Wiley & Sons, Inc., pp. i, ii, xi–xv, and 39–53.*

* cited by examiner

Primary Examiner—Tuan Dam
Assistant Examiner—Eric B. Kiss
(74) Attorney, Agent, or Firm—Staas & Halsey LLP

(57) ABSTRACT

A program trace apparatus intercepts control during execution thereof by rewriting of an instruction sequence of a program and traces an execution state of the original program. The program trace apparatus includes a judging section for judging whether or not an arbitrary instruction which is to be rewritten to intercept the control is longer than a control transfer instruction which is written over the arbitrary instruction to intercept the control, and an identification section for identifying a trace point by storing an index data for identifying a rewritten location in one or more surplus bytes of the arbitrary instruction if the judging section judges that the arbitrary instruction is longer than the control transfer instruction and the one or more surplus bytes exist in the arbitrary instruction.

25 Claims, 9 Drawing Sheets

| |
|---|
| ELEMENT NO. OF TRACE POINT INFO 13 MANAGING TRACE POINT x |
| ELEMENT NO. OF TRACE POINT INFO 13 MANAGING TRACE POINT y |
| ... |
| VACANT |
| VACANT |
| ... |

FIG. 5

| ADDRESS OF TRACE POINT 1 | ORIGINAL INSTRUCTION WHICH IS REWRITTEN (SAVE REGION) | EXECUTING INSTRUCTION SEQUENCE OF RETURN PROCESS |
|---|---|---|
| ADDRESS OF TRACE POINT 2 | ORIGINAL INSTRUCTION WHICH IS REWRITTEN | EXECUTING INSTRUCTION SEQUENCE OF RETURN PROCESS |
| ⋮ | | |
| ADDRESS OF TRACE POINT n | ORIGINAL INSTRUCTION WHICH IS REWRITTEN | EXECUTING INSTRUCTION SEQUENCE OF RETURN PROCESS |

| ADDRESS OF TRACE POINT 1 | ADDRESS OF ACTUAL TRACE POINT | ORIGINAL INSTRUCTION WHICH IS REWRITTEN | EXECUTING INSTRUCTION SEQUENCE OF RETURN PROCESS |
|---|---|---|---|
| ADDRESS OF TRACE POINT 2 | ADDRESS OF ACTUAL TRACE POINT | ORIGINAL INSTRUCTION WHICH IS REWRITTEN | EXECUTING INSTRUCTION SEQUENCE OF RETURN PROCESS |
| ... | | | |
| ADDRESS OF TRACE POINT n | ADDRESS OF ACTUAL TRACE POINT | ORIGINAL INSTRUCTION WHICH IS REWRITTEN | EXECUTING INSTRUCTION SEQUENCE OF RETURN PROCESS |

PROGRAM TRACE METHOD AND APPARATUS, AND STORAGE MEDIUM

BACKGROUND OF THE INVENTION

This application claims the benefit of a Japanese Patent Application No. 11-328758 filed Nov. 18, 1999, in the Japanese Patent Office, the disclosure of which is hereby incorporated by reference.

1. Field of the Invention

The present invention generally relates to program trace methods and apparatuses and storage media, and more particularly to a program trace method and apparatus for tracing a program which operates in a computer, and to a computer-readable storage medium which stores a program for causing a computer to make a program trace.

A program trace function refers to a function of tracing a program which operates in a computer. Tracing the program includes recording a history of processing blocks executed during operation of the program, such as the history of executed mathematical functions procedures and routines.

2. Description of the Related Art

Conventionally, in a program trace apparatus, a so-called break point instruction is embedded at an address which is specified as a trace point. In addition, the program trace apparatus employs a trace point management which manages information related to the specified trace point by a table.

However, according to the simple trace point management described above, there is a problem in that an extremely long search time is required. For example, in a case where an extremely large number of mathematical functions provided by an operating system or the like are to be traced in their entirety, the trace point is identified after intercepting the control at the trace point, which results in the extremely long search time.

On the other hand, it is conceivable to construct the program trace apparatus so as to overwrite a plurality of instructions and transfer additional information when intercepting the control. However, when overwriting a plurality of instructions, it will be necessary to judge whether or not a branch instruction will jump to an instruction which is being rewritten. Hence, it will be necessary to analyze the instructions throughout the entire program. In addition, if the branch instruction will jump to the instruction which is being rewritten, it will also be necessary to make a modification so as to adapt to the original branch instruction. Furthermore, in a multi-processor system, it will also be necessary to carry out an exclusive process during the rewriting of the instruction. For these reasons, there is a problem in that this conceivable program trace apparatus which overwrites a plurality of instructions and transfers the additional information when intercepting the control is difficult to realize.

SUMMARY OF THE INVENTION

Accordingly, it is a general object of the present invention to provide a novel and useful program trace method and apparatus and storage medium, in which the problems described above are eliminated.

Another and more specific object of the present invention is to provide a program trace method and apparatus and a storage medium, which can carry out a program trace at a high speed by searching trace points within a short time, even with respect to a extremely large number of trace points which are specified.

Still another object of the present invention is to provide a program trace apparatus which intercepts control during execution thereof by rewriting of an instruction sequence of a program and traces an execution state of the original program, comprising first judging means for judging whether or not an arbitrary instruction which is to be rewritten to intercept the control is longer than a control transfer instruction which is written over the arbitrary instruction to intercept the control, and first identification means for identifying a trace point by storing an index data for identifying a rewritten location in one or more surplus bytes of the arbitrary instruction if the first judging means judges that the arbitrary instruction is longer than the control transfer instruction and the one or more surplus bytes exist in the arbitrary instruction. According to the program trace apparatus of the present invention, it is possible to easily rewrite the instruction during execution of the program, and it is possible to carry out the program trace at a high speed by searching the trace point within a short time even in a case where an extremely larger number of parts of the instruction are rewritten at the same time in order to intercept the control.

A further object of the present invention is to provide a program trace apparatus which intercepts control during execution thereof by rewriting of an instruction sequence of a program and traces an execution state of the original program, comprising means for rewriting an arbitrary instruction which is to be rewritten by an index data which specifies a trace point and a control transfer instruction which is used to intercept the control, and means for identifying the trace point by use of the index data notified by an interrupt. According to the program trace apparatus of the present invention, it is possible to easily rewrite the instruction during execution of the program, and it is possible to carry out the program trace at a high speed by searching the trace point within a short time even in a case where an extremely larger number of parts of the instruction are rewritten at the same time in order to intercept the control.

Another object of the present invention is to provide a computer-readable storage medium which stores a program trace program for causing a computer to carry out a program trace which intercepts control during execution thereof by rewriting of an instruction sequence of a program and traces an execution state of the original program, the program trace program comprising a first procedure causing the computer to judge whether or not an arbitrary instruction which is to be rewritten to intercept the control is longer than a control transfer instruction which is written over the arbitrary instruction to intercept the control, and a first identification procedure causing the computer to identify a trace point by storing an index data for identifying a rewritten location in one or more surplus bytes of the arbitrary instruction if the first judging means judges that the arbitrary instruction is longer than the control transfer instruction and the one or more surplus bytes exist in the arbitrary instruction. According to the storage medium of the present invention, it is possible to easily rewrite the instruction during execution of the program, and it is possible to carry out the program trace at a high speed by searching the trace point within a short time even in a case where an extremely larger number of parts of the instruction are rewritten at the same time in order to intercept the control.

Still another object of the present invention is to provide a computer-readable storage medium which stores a program trace program for causing a computer to carry out a program trace which intercepts control during execution thereof by rewriting of an instruction sequence of a program and traces an execution state of the original program, the program trace program comprising a procedure causing the computer to rewrite an arbitrary instruction which is to be rewritten by an index data which specifies a trace point and a control transfer instruction which is used to intercept the control, and a procedure causing the computer to identify the trace point by use of the index data notified by an interrupt. According to the storage medium of the present invention, it is possible to easily rewrite the instruction during execution of the program, and it is possible to carry out the program trace at a high speed by searching the trace point within a short time even in a case where an extremely larger number of parts of the instruction are rewritten at the same time in order to intercept the control.

A further object of the present invention is to provide a program trace method which intercepts control during execution thereof by rewriting of an instruction sequence of a program and traces an execution state of the original program, comprising the steps of (a) judging whether or not an arbitrary instruction which is to be rewritten to intercept the control is longer than a control transfer instruction which is written over the arbitrary instruction to intercept the control, and (b) identifying a trace point by storing an index data for identifying a rewritten location in one or more surplus bytes of the arbitrary instruction if the step (a) judges that the arbitrary instruction is longer than the control transfer instruction and the one or more surplus bytes exist in the arbitrary instruction. According to the program trace method of the present invention, it is possible to easily rewrite the instruction during execution of the program, and it is possible to carry out the program trace at a high speed by searching the trace point within a short time even in a case where an extremely larger number of parts of the instruction are rewritten at the same time in order to intercept the control.

Another object of the present invention is to provide a program trace apparatus which intercepts control during execution thereof by rewriting of an instruction sequence of a program and traces an execution state of the original program, comprising the steps of (a) rewriting an arbitrary instruction which is to be rewritten by an index data which specifies a trace point and a control transfer instruction which is used to intercept the control, and (b) identifying the trace point by use of the index data notified by an interrupt. According to the program trace method of the present invention, it is possible to easily rewrite the instruction during execution of the program, and it is possible to carry out the program trace at a high speed by searching the trace point within a short time even in a case where an extremely larger number of parts of the instruction are rewritten at the same time in order to intercept the control.

Other objects and further features of the present invention will be apparent from the following detailed description when read in conjunction with the accompanying drawings.

DESCRIPTION OF THE PREFERRED EMBODIMENTS

Figure 1:
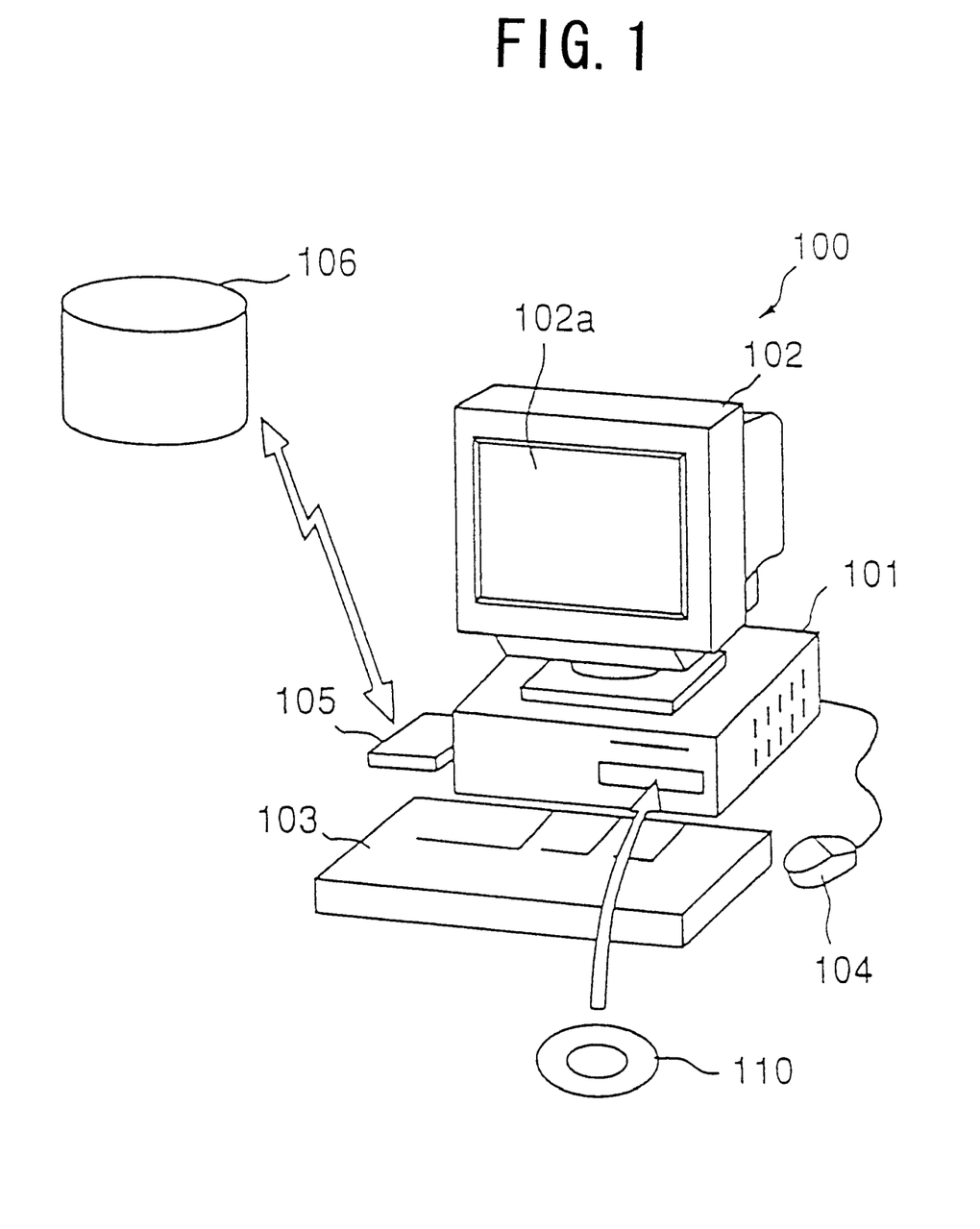
FIG. 1 is a perspective view showing a first embodiment of a program trace apparatus according to the present invention.

FIG. 1 is a perspective view showing a first embodiment of a program trace apparatus according to the present invention. This first embodiment of the program trace apparatus employs a first embodiment of the program trace method according to the preesnt invention. In this embodiment, the program trace apparatus according to the present invention is applied to a desk-top type computer system, but the present invention is of course similarly applicable to a portable type computer system.

A computer system 100 shown in FIG. 1 generally includes a main body 101 which includes a CPU, a disk drive unit and the like, a display 102 for displaying an image on a display screen 102a in response to an instruction from the main body 101, a keyboard 103 for inputting various kinds of information to the computer system 100, a mouse 104 for specifying an arbitrary position on the display screen 102a of the display 102, and a modem 105 for accessing an external database or the like and downloading a program or the like stored in another computer system.

A program (program tracing software) which causes the computer system 100 to have a program tracing function is stored in a portable recording medium such as a disk 110 or, is downloaded from a recording medium 106 of another computer system using a communication unit such as the modem 105. A computer-readable storage medium according to the present invention is formed by a recording medium such as the disk 110 which stores the program. A recording medium which forms the computer-readable storage medium according to the present invention is not limited to portable recording media such as the disk 110, IC card memory, floppy disk, magneto-optical disk and CD-ROM, but also includes various kinds of recording media accessible by a computer system which is connected via a communication means or a communication unit such as the modem 105 and a LAN.

Figure 2:
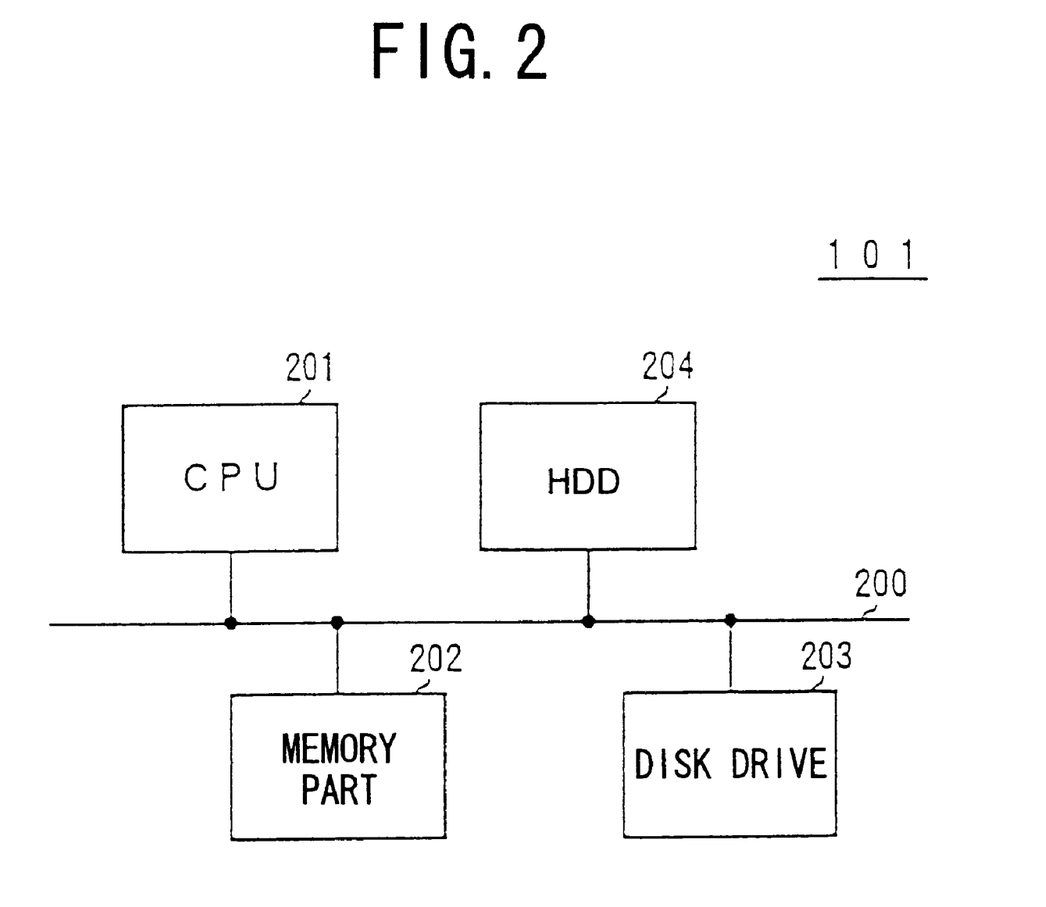
FIG. 2 is a system block diagram showing the construction of an important part within a main body of a computer system.

FIG. 2 is a system block diagram for explaining the construction of an important part within the main body 101 of the computer system 100. In FIG. 2, the main body 101 generally includes a CPU 201, a memory part 202 including a RAM, ROM and the like, a disk drive 203 for the disk 110, and a hard disk drive (HDD) 204 which are connected via a bus 200. Although an illustration thereof will be omitted in FIG. 2, the display 102, the keyboard 103, the mouse 104 and the like may be connected to the CPU 201 via the bus 200 or, connected directly to the CPU 201.

The construction of the computer system 100 is of course not limited to that shown in FIGS. 1 and 2, and various other known constructions may be used instead.

Figure 3:
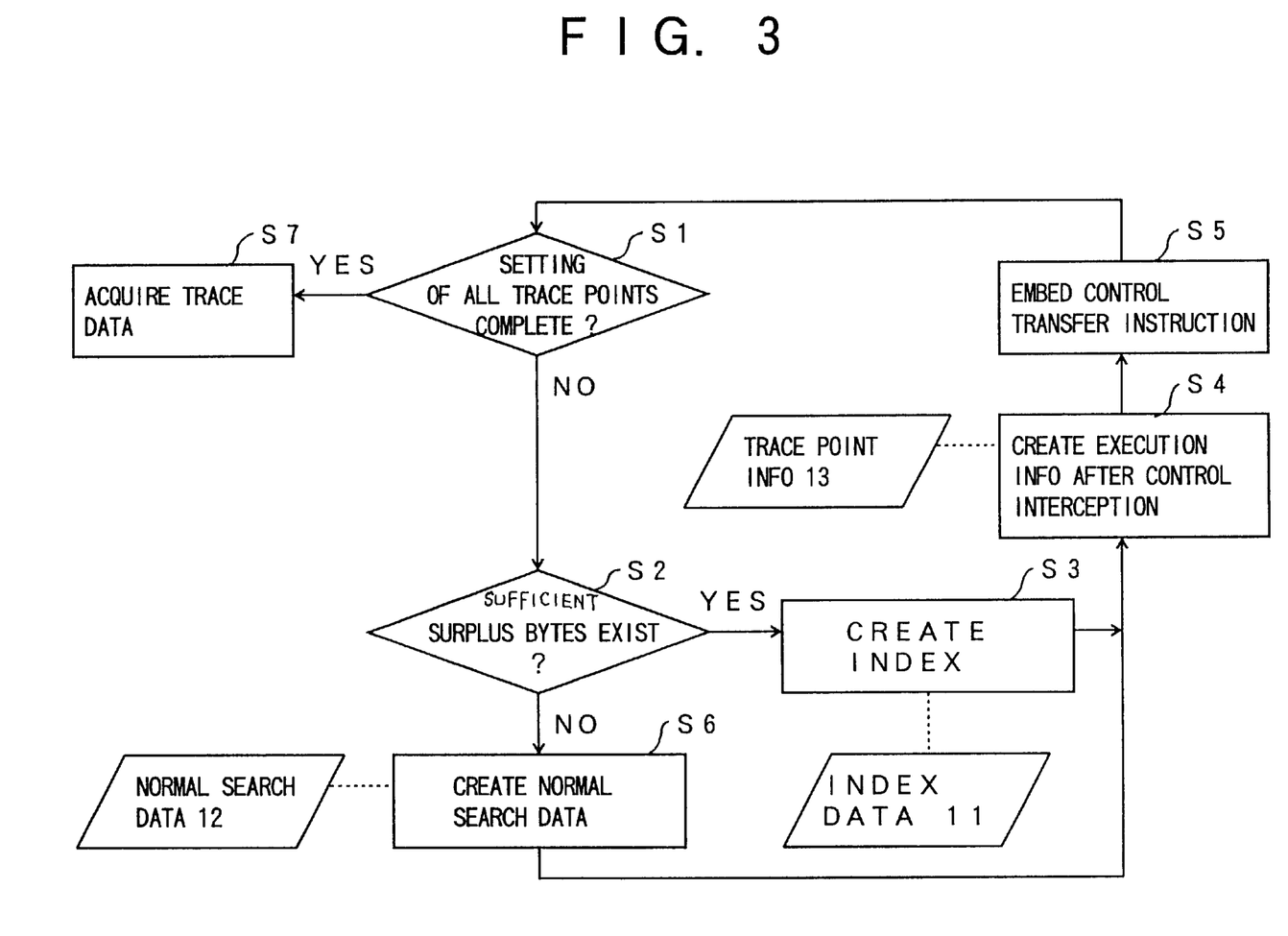
FIG. 3 is a flow chart for explaining a trace point setting process of the first embodiment of the program trace apparatus.

FIG. 3 is a flow chart for explaining a trace point setting process of the CPU 201 in this first embodiment. A first embodiment of the computer-readable storage medium according to the present invention is formed by a recording medium such as the disk 110, and stores a program for causing the CPU 201 to carry out the trace point setting process shown in FIG. 3.

In FIG. 3, a step S1 decides whether or not the setting of all trace points is completed, and the process advances to a step S2 if the decision result in the step S1 is NO. The step S2 decides, with respect to a specified trace point, whether or not a length of an instruction which is to be written is longer than a control transfer instruction which is used to intercept the control and sufficient surplus bytes exist. If the decision result in the step S2 is YES, a step S3 creates, with respect to the specified trace point, an index data 11 which is used to specify this specified trace point and is stored in the surplus bytes. In this embodiment, the index data 11 has a structure shown in FIG. 4, and stores element numbers of trace point information 13 which manages each trace point, as will be described later.

Figure 5:
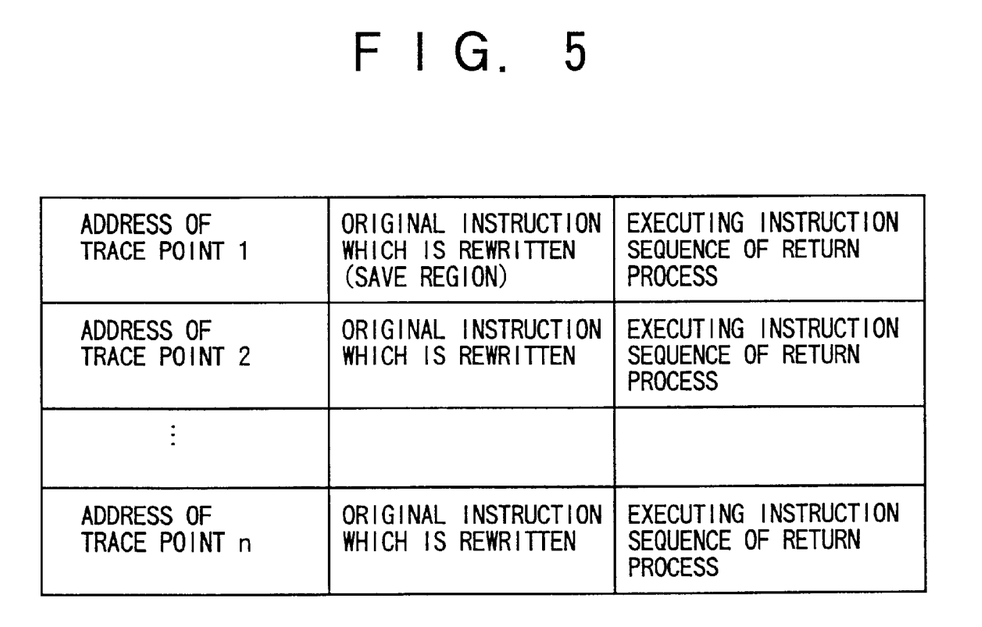
FIG. 5 is a diagram showing the structure of trace point information.

A step S4 creates the trace point information 13, that is, execution information after the control is intercepted. In this embodiment, the trace point information 13 has a structure shown in FIG. 5. FIG. 5 shows a case where n trace points exist, and a one-dimensional array of trace point addresses is used as the input data. As shown in FIG. 5, the trace point information 13 stores an original instruction before being rewritten (save region) and an execution instruction sequence of a return process. In addition, a step S5 embeds a control transfer instruction, and the process returns to the step S1.

If the decision result in the step S2 is NO, a step S6 creates a hashed normal search data 12 by use of the trace point address, with respect to the trace point for which an index cannot be created, and the process advances to the step S4. The step S6 may also create the normal search data 12 which is sorted depending on the trace point address so as to additionally carry out a binary search.

On the other hand, if the decision result in the step S1 is YES, a step S7 carries out a trace data acquisition process which will be described later in conjunction with FIG. 6.

Figure 4:
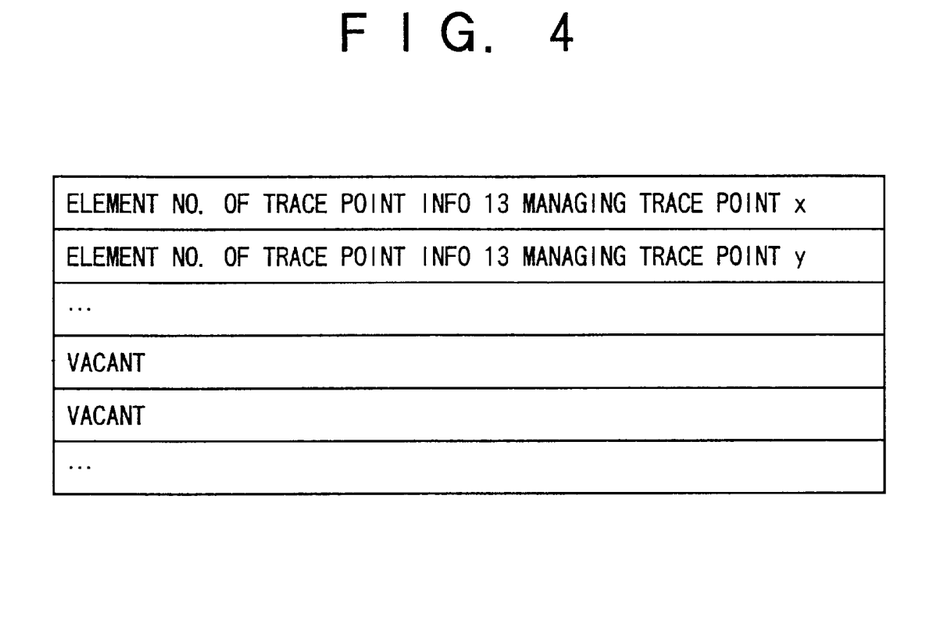
FIG. 4 is a diagram showing the structure of index data.

Accordingly, the trace point information 13 shown in FIG. 5 is constructed as an array of structure data of each of the trace points. In addition, the index data 11 shown in FIG. 4 is constructed as an array indicating the elements of the trace point information 13, and the element number of the array in the index data 11 is used as the index. For example, in the case of a X86 architecture of a PENTIUM processor manufactured by INTEL CORPORATION, a 1-byte instruction INT3 (operation code is CC in hexadecimal) may be used as the control transfer instruction for intercepting the control. Hence, in this case, the step S3 uses the array of the index data 11 in a sequence starting from the first element, and creates a 2-byte index when the instruction length of the original instruction at the trace point is three or more bytes. In other words, since the 1-byte instruction INT3 is used as the control transfer instruction for intercepting the control in this case, a 2-byte index is created if the surplus bytes amount to two or more bytes.

It is possible to simultaneously employ an index management for one byte and an index management for two or more bytes, so that the index can be created even in a case where only one surplus byte exists. In addition, when carrying out the process by fixing the index length to two bytes, it is possible to omit the creation of the index data 11, and directly use the element number of the trace point information 13 as the index.

Figure 6:
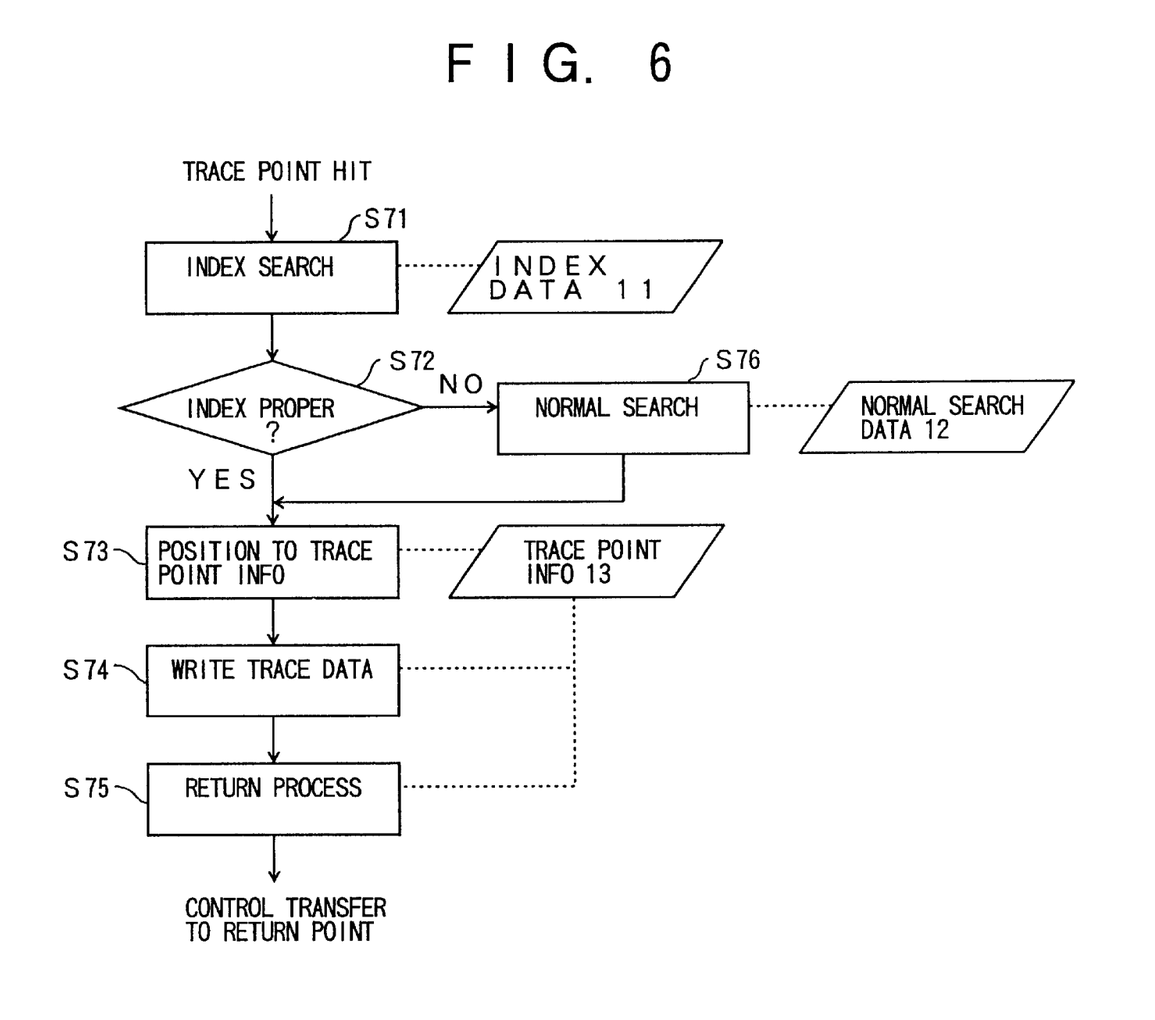
FIG. 6 is a flow chart for explaining a trace data acquisition process.

FIG. 6 is a flow chart for explaining the trace data acquisition process which is carried out in the step S7 shown in FIG. 3. In FIG. 6, a step S71 searches the index from the index data 11, in response to the interception of the control, that is, in response to a trace point hit. A step S72 decides whether or not the searched index is proper. More particularly, after the control is intercepted, two bytes are read from a branch source address, and a decision is made to determine whether or not the read value is less than or equal to a maximum index. If the read value is less than or equal to the maximum index, the trace point information is subtracted from the element number of the trace point information 13 which is stored in the index data 11, so as to decide whether or not branching source address and an address stored in the trace point information 13 match. A result of this decision which indicates whether or not the branching source address matches the address stored in the trace point information 13, corresponds to the decision result of the step S72.

If the decision result in the step S72 is YES, a step S73 makes a positioning to the trace point information 13, and a step S74 carries out a trace data write process. In addition, a step S75 carries out a return process, so as to make a control transfer to a return point.

On the other hand, if the decision result in the step S72 is NO, a step S76 uses the normal search data 12 and makes a positioning to a corresponding element of the trace point information 13. After the step S76, the process advances to the step S73, and the trace data write process and the return process are carried out as described above.

Therefore, with respect to the specified trace point, this embodiment judges whether not the length of the instruction which is to be rewritten is longer than the control transfer instruction which is used to intercept the control and sufficient surplus bytes exist. With respect to this trace point, this embodiment creates the index data which specifies the trace point and is stored in the surplus bytes. With respect to the trace point for which the index data cannot be created, the normal search data for searching the trace point by another method is created.

In other words, depending on the surplus bytes after the rewriting, the index data is created as far as possible. With respect to the trace point for which the index data cannot be created, the control is intercepted, and thereafter, the search is made under an appropriate overhead based on the normal search data of the binary search, hash search and the like. However, with respect to the trace point for which the index data can be created, the data of the following address is read and is directly used as the index, thereby enabling the identification of the trace point at a high speed. Accordingly, this embodiment is particularly suited for a program trace where a code for acquiring the trace cannot be embedded beforehand in the program which is executed, and the history of the execution is acquired by setting the trace point when executing the program.

Next, a description will be given of a second embodiment of the program trace apparatus according to the present invention. This second embodiment of the program trace apparatus employs a second embodiment of the program trace method according to the present invention. In this second embodiment, it is assumed for the sake of convenience that the program trace apparatus according to the present invention is also applied to the desk-top type computer system shown in FIGS. 1 and 2 described above.

Figure 7:
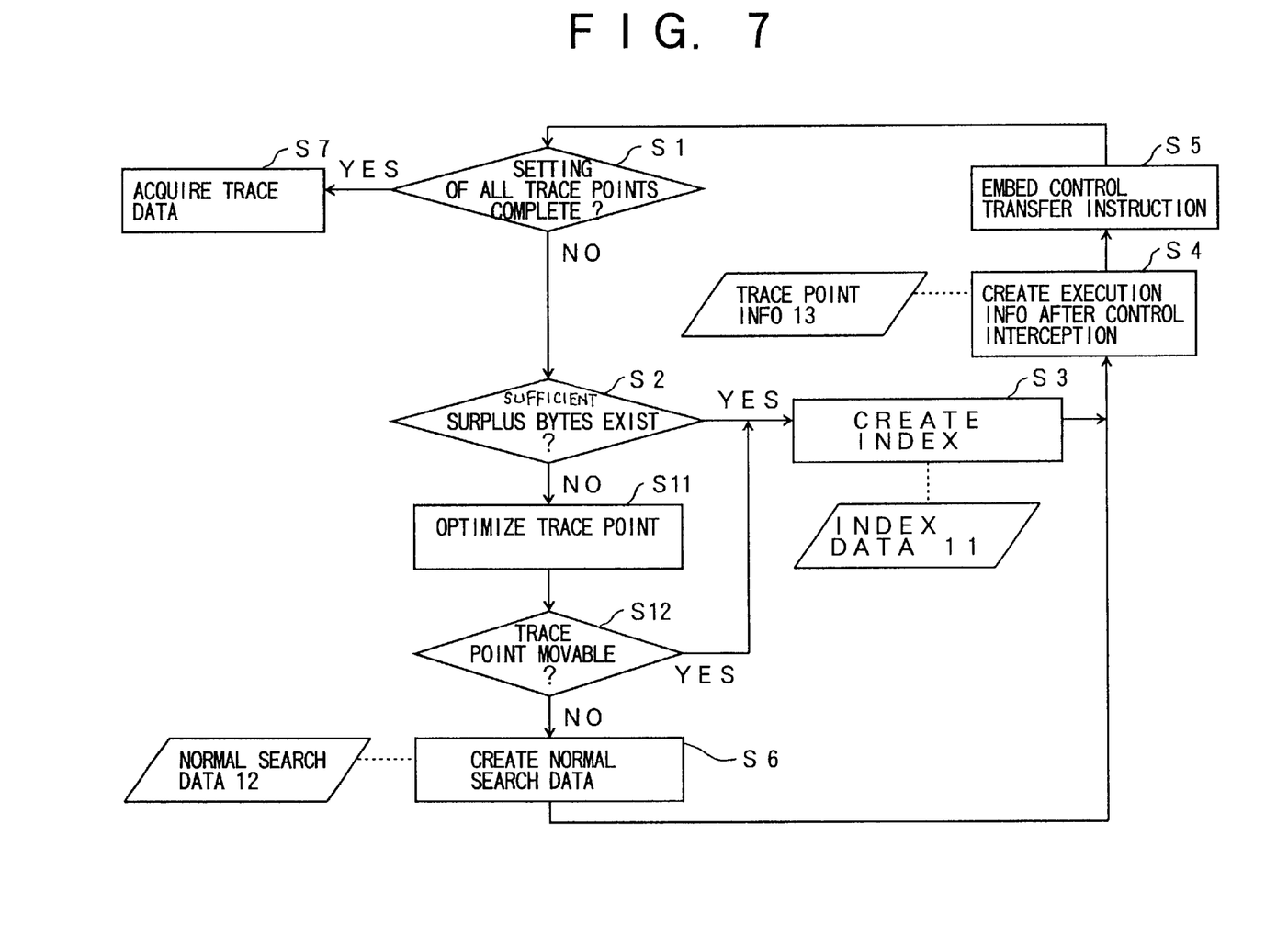
FIG. 7 is a flow chart for explaining the trace point setting process of a second embodiment of the program trace apparatus according to the present invention.

FIG. 7 is a flow chart for explaining the trace point setting process of the CPU 201 in this second embodiment. A second embodiment of the computer-readable storage medium according to the present invention is formed by a recording medium such as the disk 110, and stores a program for causing the CPU 201 to carry out the trace point setting process shown in FIG. 7. In FIG. 7, those steps which are the same as those corresponding steps in FIG. 3 are designated by the same reference numerals, and a description thereof will be omitted.

Figure 8:
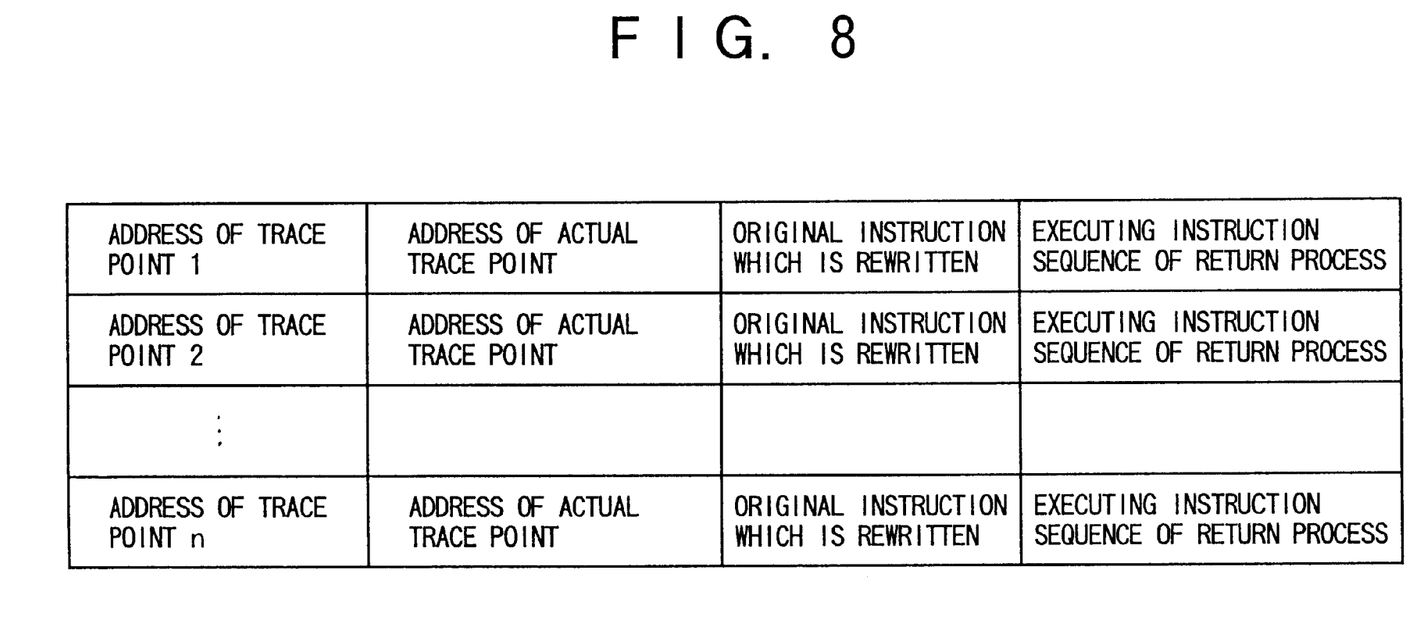
FIG. 8 is a diagram showing the structure of trace point information.

In addition, FIG. 8 is a diagram showing the structure of the trace point information 13 which is used in this second embodiment. As shown in FIG. 8, the trace point information 13 used in this second embodiment also stores an address of the actual trace point, with respect to each of the trace points.

In FIG. 7, if the decision result in the step S2 is NO, steps S11 and S12 are carried out, and the process advances to the step S3 if the decision result in the step S12 is YES, while the process advances to the step S6 if the decision result in the step S12 is NO. The step S11 carries out a trace point optimization process. The step S12 decides whether or not the trace point is movable, based on a result of the trace point optimization process. More particularly, the length of the following instruction and the meaning of the instruction are analyzed based on the address of the specified trace point, and in the case of the X86 architecture, for example, an instruction sequence of three or more bytes is searched until a branch instruction or an instruction to which the branch instruction jumps is reached. If the instruction sequence of three or more bytes is found, this instruction sequence is selected as the actual trace point and is transferred to the step S3 and the subsequent steps, so as to reflect the trace point to the trace point information 13.

Of course, a selection logic which is used to select the instruction sequence as the actual trace point is not limited to that described above. In other words, it is possible to employ an arbitrary selection logic such as a selection logic which simply judges the appropriateness only for the following instruction.

Figure 9:
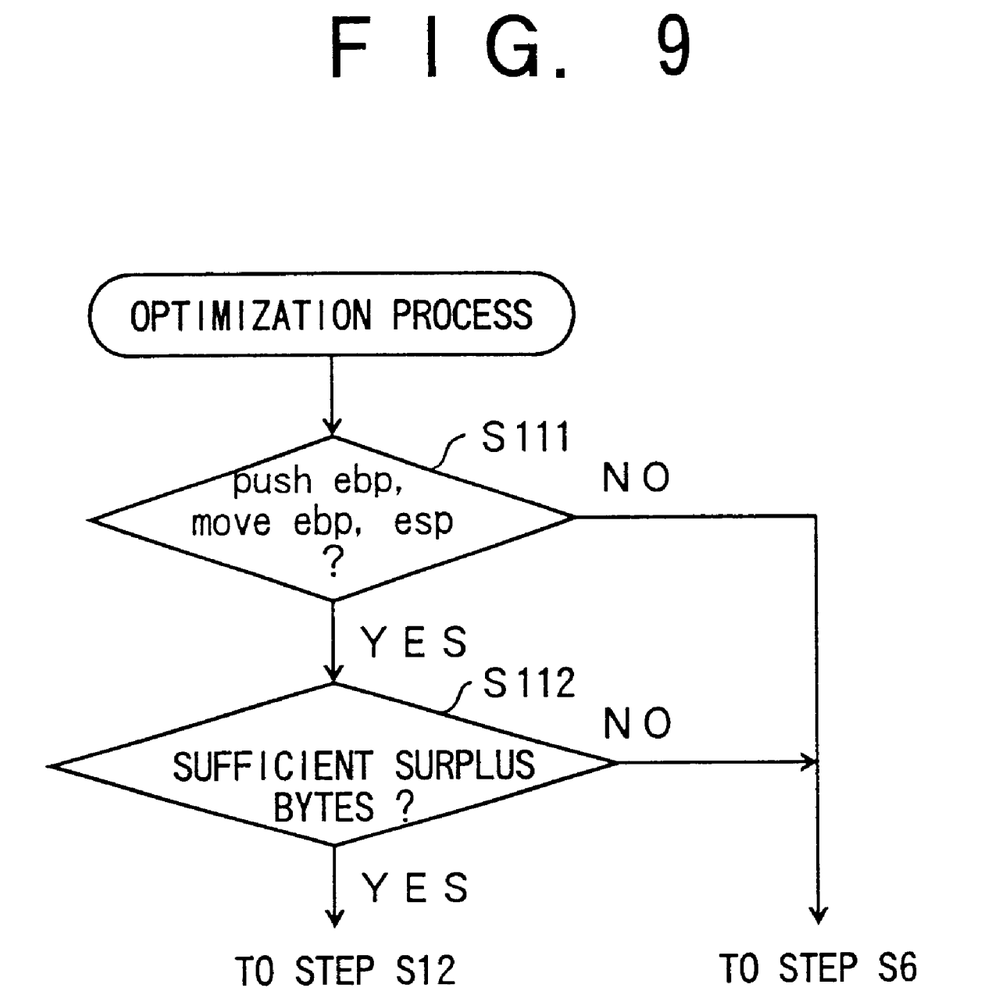
FIG. 9 is a flow chart for explaining an embodiment of a trace point optimization process.

FIG. 9 is a flow chart for explaining an embodiment of the trace point optimization process which is carried out by the step S11 shown in FIG. 7. In the case of the X86 architecture, for example, a step S111 shown in FIG. 9 decides whether or not a first instruction of the mathematical function is "push ebp, move ebp, esp".

Figure 10:
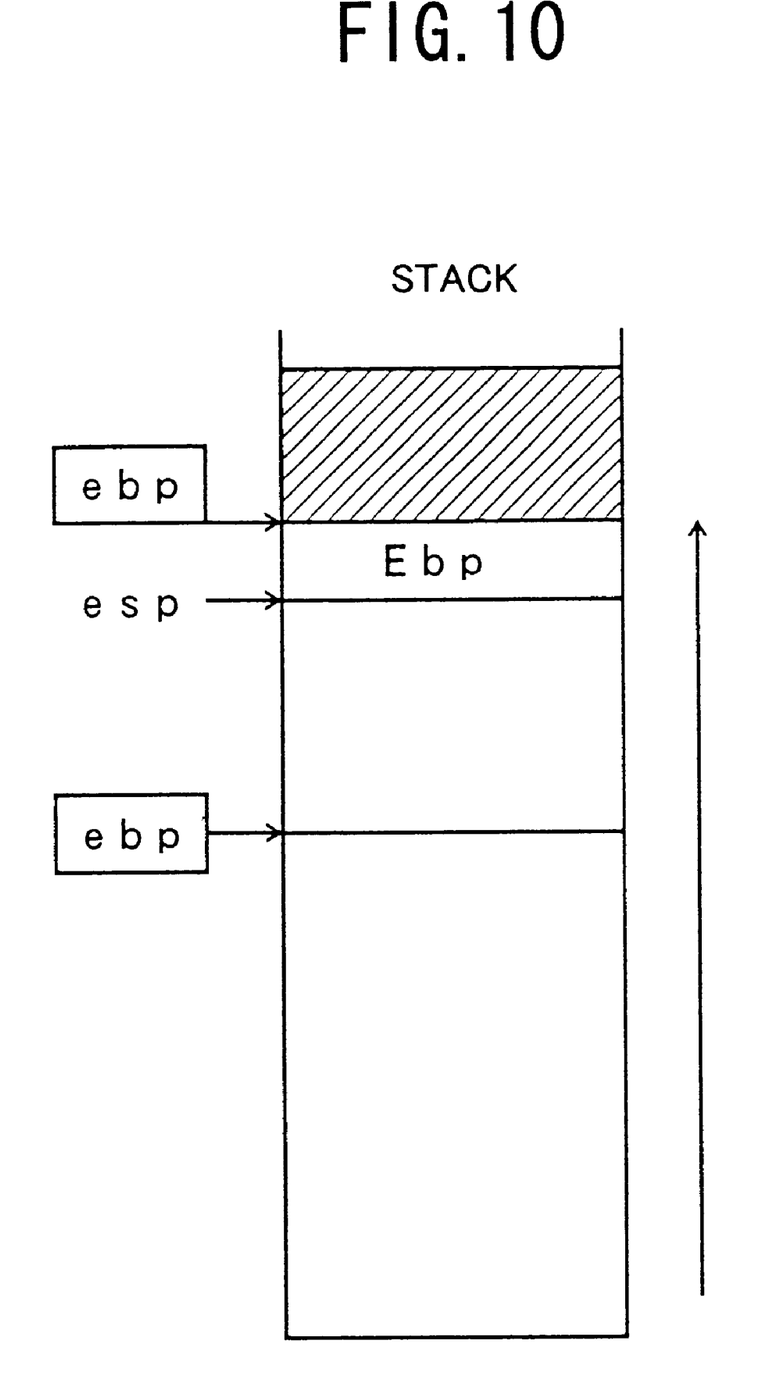
FIG. 10 is a diagram for explaining an instruction judged by the process shown in FIG. 9.

FIG. 10 is a diagram for explaining the instruction "push ebp, move ebp, esp".

If the decision result in the step S111 is YES, a step S112 decides whether or not sufficient surplus bytes exist in a next instruction length. If the decision result in the step S112 is YES, the process advances to the step S12 shown in FIG. 7. On the other hand, if the decision result in the step S111 or the step S112 is NO, the process advances to the step S6 shown in FIG. 7.

Therefore, with respect to the specified trace point, this embodiment judges whether not the length of the instruction which is to be rewritten is longer than the control transfer instruction which is used to intercept the control and sufficient surplus bytes exist. With respect to this trace point, this embodiment creates the index data which specifies the trace point and is stored in the surplus bytes. With respect to the trace point for which the index data cannot be created, a judgement is made to determine whether or not it is possible to make a trace equivalent to a trace by a given address even when a control interception address is moved to one of the following instructions. If it is judged that such an equivalent trace is possible, a search is made for an instruction which is longer than the control transfer instruction and is suited to be rewritten, and the index information is created by automatically optimizing the trace point. With respect to the trace point for which the index data cannot be created and the optimization cannot be made, the normal search data for searching the trace point by another method is created similarly as in the case of the first embodiment described above.

In other words, in a case where the trace point is specified with respect to the address of the instruction having no surplus bytes after the rewriting, it is impossible to create the index information by the first embodiment described above. But in the second embodiment, the actual trace point is automatically moved to the following instruction which is appropriate, by the trace point optimization process. Hence, it is possible to create the index information with respect to even a larger number of trace points as compared to the first embodiment. As a result, the second embodiment can further reduce the overhead for the identification of the trace point. Therefore, the second embodiment is also particularly suited for the program trace where the code for acquiring the trace cannot be embedded beforehand in the program which is executed, and the history of the execution is acquired by setting the trace point when executing the program.

In addition, the identification of the trace point in the embodiments described above may be regarded as being carried out by use of the index data notified by an interrupt.

Further, the present invention is not limited to these embodiments, but various variations and modifications may be made without departing from the scope of the present invention.

What is claimed is:

1. A program trace apparatus which intercepts control during execution thereof by rewriting of an instruction sequence of a program and traces an execution state of the original program, comprising:
   a first judging unit to judge whether or not an arbitrary instruction which is to be rewritten to intercept the control is longer than a control transfer instruction which is written over the arbitrary instruction to intercept the control; and
   a first identification unit to identify a trace point by storing an index data for identifying a rewritten location in one or more surplus bytes of the arbitrary instruction if said first judging unit judges that the arbitrary instruction is longer than the control transfer instruction and the one or more surplus bytes exist in the arbitrary instruction.

2. The program trace apparatus as claimed in claim 1, further comprising:
   a second identification unit to identify the trace point by use of a separate control data which manages the trace point, if said first judging unit judges that the arbitrary instruction is longer than the control transfer instruction but no sufficient surplus byte exists in the arbitrary instruction.

3. The program trace apparatus as claimed in claim 1, further comprising:
   a second judging unit to judge whether or not a trace equivalent to a trace at a given address is possible even when a control interception address is moved to one of following instructions, if said first judging unit judges that the arbitrary instruction is longer than the control transfer instruction; and
   a search unit to search an instruction which is longer than the control transfer instruction and is suited to be rewritten, if said second judging unit judges that the equivalent trace is possible, wherein said first identification unit identifies the trace point based on the instruction which is searched by said search unit, even if no sufficient surplus byte exists in the arbitrary instruction.

4. The program trace apparatus as claimed in claim 2, further comprising:

a second judging unit to judge whether or not a trace equivalent to a trace at a given address is possible even when a control interception address is moved to one of following instructions, if said first judging unit judges that the arbitrary instruction is longer than the control transfer instruction; and a search unit to search an instruction which is longer than the control transfer instruction and is suited to be rewritten, if said second judging unit judges that the equivalent trace is possible, wherein said first identification unit identifies the trace point based on the instruction which is searched by said search unit, even if no sufficient surplus byte exists in the arbitrary instruction.

5. The program trace apparatus as claimed in claim 1, wherein the index data includes trace point information which manages each trace point, and the trace point information includes with respect to each trace point address an original instruction which is rewritten and an execution instruction sequence of a return process.

6. The program trace apparatus as claimed in claim 2, wherein the index data includes trace point information which manages each trace point, and the trace point information includes with respect to each trace point address an original instruction which is rewritten and an execution instruction sequence of a return process.

7. The program trace apparatus as claimed in claim 3, wherein the index data includes trace point information which manages each trace point, and the trace point information includes with respect to each trace point address an original instruction which is rewritten and an execution instruction sequence of a return process.

8. A program trace apparatus which intercepts control during execution thereof by rewriting of an instruction sequence of a program and traces an execution state of the original program, comprising:

a rewriting unit to rewrite an arbitrary instruction which is to be rewritten by an index data which specifies a trace point and a control transfer instruction which is used to intercept the control; and an identifying unit to identify the trace point by use of the index data, which is notified by an interrupt, and which has a rewritten location stored in one or more surplus bytes of the arbitrary instruction if the arbitrary instruction is longer than the control transfer instruction and the one or more surplus bytes exist in the arbitrary instruction.

9. A computer-readable storage medium which stores a program trace program for causing a computer to carry out a program trace which intercepts control during execution thereof by rewriting of an instruction sequence of a program and traces an execution state of the original program, said program trace program comprising:

a first judging procedure causing the computer to judge whether or not an arbitrary instruction which is to be rewritten to intercept the control is longer than a control transfer instruction which is written over the arbitrary instruction to intercept the control; and a first identification procedure causing the computer to identify a trace point by storing an index data for identifying a rewritten location in one or more surplus bytes of the arbitrary instruction if said first judging procedure judges that the arbitrary instruction is longer than the control transfer instruction and the one or more surplus bytes exist in the arbitrary instruction.

10. The computer-readable storage medium as claimed in claim 9, wherein said program trace program further comprises:

a second identification procedure causing the computer to identify the trace point by use of a separate control data which manages the trace point, if said first judging procedure judges that the arbitrary instruction is longer than the control transfer instruction but no sufficient surplus byte exists in the arbitrary instruction.

11. The computer-readable storage medium as claimed in claim 9, wherein said program trace program further comprises:

a second judging procedure causing the computer to judge whether or not a trace equivalent to a trace at a given address is possible even when a control interception address is moved to one of following instructions, if said first judging procedure judges that the arbitrary instruction is longer than the control transfer instruction; and a search procedure causing the computer to search an instruction which is longer than the control transfer instruction and is suited to be rewritten, if said second judging procedure judges that the equivalent trace is possible, wherein said first identification procedure causes the computer to identify the trace point based on the instruction which is searched by said search means, even if no sufficient surplus byte exists in the arbitrary instruction.

12. The computer-readable storage medium as claimed in claim 10, wherein said program trace program further comprises:

a second judging procedure causing the computer to judge whether or not a trace equivalent to a trace at a given address is possible even when a control interception address is moved to one of following instructions, if said first judging procedure judges that the arbitrary instruction is longer than the control transfer instruction; and a search procedure causing the computer to search an instruction which is longer than the control transfer instruction and is suited to be rewritten, if said second judging procedure judges that the equivalent trace is possible, wherein said first identification procedure causes the computer to identify the trace point based on the instruction which is searched by said search procedure, even if no sufficient surplus byte exists in the arbitrary instruction.

13. The computer-readable storage medium as claimed in claim 9, wherein the index data includes trace point information which manages each trace point, and the trace point information includes with respect to each trace point address an original instruction which is rewritten and an execution instruction sequence of a return process.

14. The computer-readable storage medium as claimed in claim 10, wherein the index data includes trace point information which manages each trace point, and the trace point information includes with respect to each trace point address an original instruction which is rewritten and an execution instruction sequence of a return process.

15. The computer-readable storage medium as claimed in claim 11, wherein the index data includes trace point information which manages each trace point, and the trace point information includes with respect to each trace point address an original instruction which is rewritten and an execution instruction sequence of a return process.

16. A computer-readable storage medium which stores a program trace program for causing a computer to carry out a program trace which intercepts control during execution thereof by rewriting of an instruction sequence of a program and traces an execution state of the original program, said program trace program comprising:

a procedure causing the computer to rewrite an arbitrary instruction which is to be rewritten by an index data which specifies a trace point and a control transfer instruction which is used to intercept the control; and a procedure causing the computer to identify the trace point by use of the index data, which is notified by an interrupt, and which has a rewritten location stored in one or more surplus bytes of the arbitrary instruction if the arbitrary instruction is longer than the control transfer instruction and the one or more surplus bytes exist in the arbitrary instruction.

17. A program trace method which intercepts control during execution thereof by rewriting of an instruction sequence of a program and traces an execution state of the original program, comprising:

judging whether or not an arbitrary instruction which is to be rewritten to intercept the control is longer than a control transfer instruction which is written over the arbitrary instruction to intercept the control; and identifying a trace point by storing an index data for identifying a rewritten location in one or more surplus bytes of the arbitrary instruction if it is judged that the arbitrary instruction is longer than the control transfer instruction and the one or more surplus bytes exist in the arbitrary instruction.

18. The program trace method as claimed in claim 17, further comprising:

identifying the trace point by use of a separate control data which manages the trace point, if it is judged that the arbitrary instruction is longer than the control transfer instruction but no sufficient surplus byte exists in the arbitrary instruction.

19. The program trace method as claimed in claim 17, further comprising:

judging whether or not a trace equivalent to a trace at a given address is possible even when a control interception address is moved to one of following instructions, if it is judged that the arbitrary instruction is longer than the control transfer instruction; and searching an instruction which is longer than the control transfer instruction and is suited to be rewritten, if it is judged that the equivalent trace is possible, wherein the trace point is identified based on the instruction which is searched, even if no sufficient surplus byte exists in the arbitrary instruction.

20. The program trace method as claimed in claim 18, further comprising:

judging whether or not a trace substantially equivalent to a trace at a given address is possible even when a control interception address is moved to one of following instructions, if it is judged that the arbitrary instruction is longer than the control transfer instruction; and searching an instruction which is longer than the control transfer instruction and is suited to be rewritten, if it is judged that the substantially equivalent trace is possible, wherein the trace point is identified based on the instruction which is searched, even if no sufficient surplus byte exists in the arbitrary instruction.

21. The program trace method as claimed in claim 17, wherein the index data includes trace point information which manages each trace point, and the trace point information includes with respect to each trace point address an original instruction which is rewritten and an execution instruction sequence of a return process.

22. The program trace method as claimed in claim 18, wherein the index data includes trace point information which manages each trace point, and the trace point information includes with respect to each trace point address an original instruction which is rewritten and an execution instruction sequence of a return process.

23. The program trace method as claimed in claim 19, wherein the index data includes trace point information which manages each trace point, and the trace point information includes with respect to each trace point address an original instruction which is rewritten and an execution instruction sequence of a return process.

24. A program trace apparatus which intercepts control during execution thereof by rewriting of an instruction sequence of a program and traces an execution state of the original program, comprising:

rewriting an arbitrary instruction which is to be rewritten by an index data which specifies a trace point and a control transfer instruction which is used to intercept the control; and identifying the trace point by use of the index data, which is notified by an interrupt, and which has a rewritten location stored in one or more surplus bytes of the arbitrary instruction if the arbitrary instruction is longer than the control transfer instruction and the one or more surplus bytes exist in the arbitrary instruction.

25. A method comprising:

determining whether an arbitrary instruction is longer than a control transfer instruction; and identifying a trace point by storing an index data for identifying a rewritten location in one or more surplus bytes of the arbitrary instruction if the arbitrary instruction is longer than the control transfer instruction and the one or more surplus bytes exist in the arbitrary instruction.

* * * * *